Jan. 13, 1931.  C. PFANSTIEHL  1,789,052
DENTAL FLOSS
Filed Jan. 16, 1929
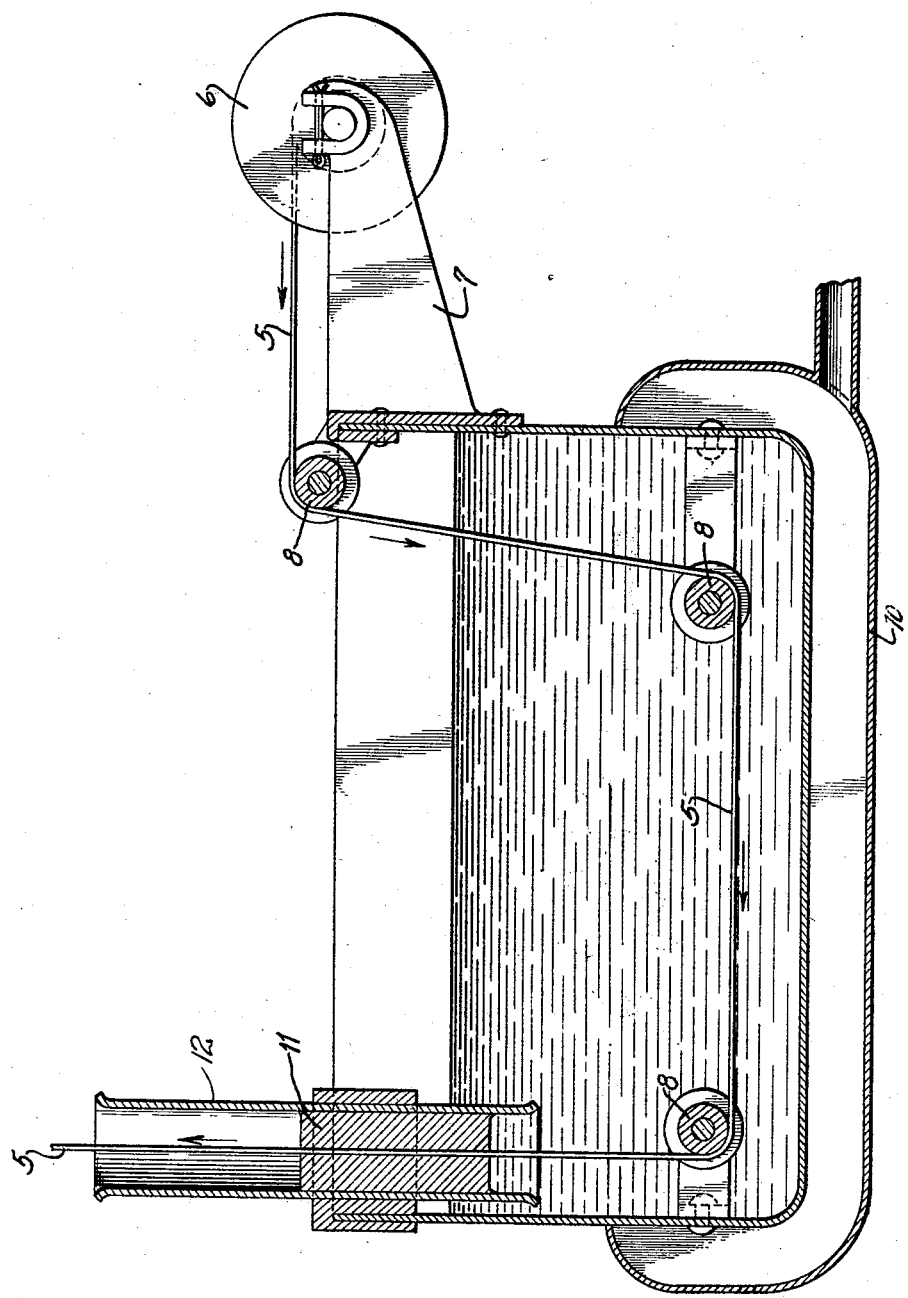
Inventor:
Carl Pfanstiehl,
By Dynyforth, Lee, Chritton & Wiles,
Attys.

Patented Jan. 13, 1931

1,789,052

UNITED STATES PATENT OFFICE

CARL PFANSTIEHL, OF HIGHLAND PARK, ILLINOIS

DENTAL FLOSS

Application filed January 16, 1929. Serial No. 332,980.

The present invention relates to improvements in dental floss and may be fully understood from the following description, illustrated by the accompanying drawings, in which the figure illustrates diagrammatically and in section apparatus suitable for preparing floss in accordance with the present invention.

In preparing floss in accordance with the present invention in one illustrative embodiment, the fiber base of the floss, designated by numeral 5, is withdrawn from a spool 6 mounted on a support 7 and is guided by guides 8 through a body of molten galactonic lactone in a mildly heated container 9. The container may be heated in any suitable manner, for example, by a steam jacket 10, or by a gas or an electric heater or the like.

The fiber, impregnated with the molten lactone, in leaving the latter is drawn through a body of melted waxy material 11 lying on the surface of the lactone and confined by the open-ended tube 12 dipping into the bath. The treated fiber cools rapidly and is spooled or otherwise prepared for use.

The fiber employed is preferably a loosely spun or twisted textile cord, flat or round although preferably the former. The melted galactonic lactone impregnates the fiber and in the use of the latter is brought directly in frictional contact with tartar and mucin deposits lodged in pockets between the teeth, and, by removal from the fiber, lactone material is left in contact with such deposits. The lactone material, in the presence of the aqueous mouth fluids, supplies an innocuous concentrated source of mild acid, acting as a potential acid. It breaks down the tartar and mucin deposits, continuously forming additional effective acid as that previously formed is utilized. The movement of the fiber of the floss then more readily effects the removal of the deposits.

Other potentially acid materials may be employed, preferably the sugar acid lactones, such as mannonic lactone, gluconic lactone, or the like. The melted lactones may be employed, the impregnating bath being kept at temperatures of, say, 80 to 100° C., or highly concentrated solutions or syrups thereof, normally liquid, may be employed at lower temperatures.

The waxy material 11 may suitably be beeswax, paraffin wax, ceresine or ceresine-like wax, or other innocuous waxy or fatty material. It imparts flexibility to the twisted floss, counteracting brittleness due to the crystalline impregnating material, and likewise prevents undue responsiveness to change in atmospheric conditions, such as humidity. Notwithstanding its insoluble character, the waxy material does not affect the action of the floss in the mouth, but in fact appears to improve it. If desired, however, the use of the waxy material may be dispensed with.

I claim:

1. Dental floss impregnated with a potential acid material.

2. Dental floss impregnated with a potential acid material and with waxy material associated with said potential acid material.

3. Dental floss impregnated with sugar acid lactone.

4. Dental floss impregnated with sugar acid lactone and with waxy material associated with said lactone.

5. Dental floss impregnated with galactonic lactone.

6. Dental floss impregnated with galactonic lactone and with waxy material associated with said lactone.

7. Dental floss comprising a fibrous cord impregnated with a potentially acid material and provided with a coating of waxy material.

8. Dental floss comprising a fibrous cord impregnated with sugar acid lactone and coated with waxy material.

9. Dental floss comprising a fibrous cord impregnated with galactonic lactone and coated with waxy material.

10. The method of preparing dental floss which comprises drawing a fibrous cord through a heated liquid body containing galactonic lactone.

11. The method of preparing dental floss which comprises passing a cord through a heated liquid body containing galactonic lactone, confining a pool of melted waxy material on the surface of said body, and withdrawing the thread through said pool.

12. The method of preparing dental floss which comprises passing a fibrous cord successively through a liquid body containing a sugar acid lactone and a pool of melted waxy material.

13. The method of preparing dental floss which comprises drawing a fibrous cord through a liquid body containing a sugar acid lactone.

In testimony whereof I have hereunto set my hand this 3d day of January, 1929.

CARL PFANSTIEHL.